United States Patent
Boulanger et al.

(10) Patent No.: US 6,414,949 B1
(45) Date of Patent: Jul. 2, 2002

(54) CDMA RECEIVER WITH PARALLEL INTERFERENCE SUPPRESSION AND WITH WEIGHTING

(75) Inventors: Christophe Boulanger, Ivry S/Seine; Laurent Ouvry, Grenoble, both of (FR)

(73) Assignee: Commissariat A L'Energie Atomique, Paris (FR)

( * ) Notice: Subject to any disclaimer, the term of this patent is extended or adjusted under 35 U.S.C. 154(b) by 0 days.

(21) Appl. No.: 09/266,919

(22) Filed: Mar. 12, 1999

(30) Foreign Application Priority Data

Mar. 24, 1998 (FR) .......................................... 98 03586

(51) Int. Cl.[7] .............................................. H04J 13/00
(52) U.S. Cl. ...................... 370/335; 335/342; 335/341; 375/148
(58) Field of Search ................................ 370/335, 320, 370/342, 441, 479, 311; 375/148

(56) References Cited

U.S. PATENT DOCUMENTS

| | | | | |
|---|---|---|---|---|
| 4,933,930 A | * | 6/1990 | Lien et al. ................... | 370/352 |
| 5,805,583 A | * | 9/1998 | Rakib ......................... | 370/342 |
| 5,831,984 A | * | 11/1998 | Hottinen ..................... | 370/441 |
| 5,835,488 A | * | 11/1998 | Sugita ........................ | 370/335 |
| 5,949,794 A | * | 9/1999 | Chiodini ..................... | 370/503 |
| 5,966,376 A | * | 10/1999 | Rakib et al. ................ | 370/342 |
| 5,970,060 A | * | 10/1999 | Baier et al. ................. | 370/342 |
| 6,014,373 A | * | 1/2000 | Schilling et al. ............ | 370/342 |

FOREIGN PATENT DOCUMENTS

WO WO 97/39546 10/1997

* cited by examiner

Primary Examiner—Hassan Kizou
Assistant Examiner—Lu Yin
(74) Attorney, Agent, or Firm—Oblon, Spivak, McClelland, Maier & Neustadt, P.C.

(57) ABSTRACT

A CDMA receiver with parallel interference suppression and with weighting. The weighting coefficients of the outputs from the various stages of the receiver are chosen in order to minimize a quadratic error weighted by the distribution of the pertinent values of the intercorrelation matrix.

7 Claims, 7 Drawing Sheets

CDMA RECEIVER WITH PARALLEL INTERFERENCE SUPPRESSION AND WITH WEIGHTING

TECHNICAL FIELD

The present invention relates to a CDMA receiver, i.e. a receiver with Code Division Multiple Access. It finds application in telecommunications and notably in mobile radio systems.

STATE OF THE PRIOR ART

The advantages of CDMA communications no longer need to be demonstrated. It is known that this technique consists of spreading a signal by a pseudo-random sequence, allocating to each user his own sequence, the allocated sequences being orthogonal to one another, transmitting all of the signals thus spread and then, on reception, narrowing down the received signal with the help of the sequences used at transmission and finally reconstituting the signals pertinent to each user.

If the various sequences of the spreading were strictly orthogonal to each other and if the propagation signals were perfect, the signals pertinent to each user would be reconstituted without any error. However, in reality, things are not so simple and each user interferes to a greater or lesser extent with the others.

In order to reduce these effects, referred to as multiple access interference it has been necessary to envisage correction means arranged in the receiver.

By way of example, one may describe the receiver that is the subject of U.S. Pat. No. 5,553,062.

FIG. 1 appended substantially reproduces FIG. 1 of the document quoted. The circuit shown allows one to supply a nominal signal designated $\hat{d}_1$, belonging to a first user. To do this, it uses an input circuit 41, receiving a signal R(t) from the multipliers 51, 61, ..., 71 connected to the generators of the pseudo-random sequences (PRS) 52, 62, ..., 72, which reproduce the sequences used for transmission by the various users, delay circuits 53, 63, ..., 73, amplifiers (AMP) 54, 64, ..., 74, and multipliers 55, 65, ..., 75. If one assumes that there are K users, there are K channels of this type arranged in parallel. The last K−1 channels permit the extraction of K−1 signals pertinent to K−1 channels and then to respread these K−1 signals by the corresponding pseudo-random sequences. One can then subtract from the general input signal R(t) all of these respread K−1 signals. To do this, a delay line 48 is provided in order to hold back the input signal R(t) for the duration of the formation of the respread K−1 signals, the respread K−1 signals and the delayed input signal being subsequently applied to a subtractor 150. This supplies a global signal from which the signals belonging to the K−1 users other than the first one, have been removed. One can then correlate this signal with the pseudo-random sequence belonging to the first user in a multiplier 147, which receives the pseudo-random sequence supplied by the generator 52, a sequence suitably delayed by a delay line 53. An amplifier 146 then supplies the estimated data $\hat{d}_1$, pertinent to the first user.

This structure can be repeated K times in order to process the K signals pertinent to the K users. Hence K first estimations of the data $\hat{d}_1, \hat{d}_2, \ldots, \hat{d}_k$ are obtained.

This procedure can be repeated in a second interference suppression stage and so on. FIG. 2 appended shows, diagrammatically s stages, the first $E_0$ being, strictly speaking, an ordinary correlation stage, the others $E_1, \ldots, E_i, \ldots, E_{s-1}$ being interference suppression stages.

One can still further improve the performance of such a receiver by using, not the last estimation obtained, but a weighted mean of the various estimates provided. This amounts to allocating a weight $w_i$ to the estimation $\hat{d}_1$, and forming the sum of the $W_i \hat{d}_i$ signals. In FIG. 2, it can be seen that all the signals supplied by stage $E_0$ are multiplied by a coefficient $w_0$ in a multiplier $M_0$, all the signals supplied by stage $E_1$ are multiplied by a coefficient $w_1$ in a multiplier $M_1$, all the signals supplied by stage $E_i$ are multiplied by a coefficient $w_i$ in a multiplier $M_i$, and all the signals supplied by the final stage $E_{s-1}$ by a coefficient $w_{s-1}$ in a multiplier $M_{s-1}$. An adder ADD then forms the sum of the signals supplied by the multipliers.

FIG. 2 also allows one to make clear certain notations appropriate to this technique. At the output of a stage, K signals are to be found corresponding to K users. Rather than individually marking these signals one can consider, in a more synthetic way, that they are the K components of a "vector". At the output of stage $E_i$ one will find K signals which are the K components of a vector designated $\overline{Z}_i$. At the output of the multipliers $M_0, M_1, \ldots, M_i, \ldots, M_{s-1}$, one will therefore find, with this synthetic notation, vectors $w_0 \overline{Z}_0, \ldots, w_1 \overline{Z}_1, \ldots, w_i \overline{Z}_i, \ldots, w_{s-1} \overline{Z}_{s-1}$. The output from the adder will therefore be designated $\overline{Z}$ and one can write:

$$\overline{Z} = \sum_{i=0}^{s-1} w_i \overline{Z}_i \quad (1)$$

There remains the question of determining the weighting coefficients wi. In the document U.S. Pat. No. 5,553,062 already mentioned, an empirical law $w_i = 1/2^i$ was proposed (column 12, line 30) without any justification. This amounts to weighting the outputs from the stages in a decreasing way.

Furthermore, the article by S. MOSHAVI et al., entitled "Multistage Linear Receivers for DS-CDMA Systems" published in the magazine "International Journal of Wireless Information Networks", vol. 3, No. 1, 1996, pages 1–17, takes up certain ideas from the patent U.S. Pat. No. 5,553,062 already mentioned and develops the theory of this type of receiver. It also proposes an optimization of the weighting coefficients.

Without going into the details of this theory, which is complex and would depart from the context of this invention, one can summarize it in the following way.

If each user only transmitted a single binary signal (or bit), one would find, in the receiver, signals including, for each user, the bit which is pertinent to him, to which would be added the parasitic interference signals due to the presence of other users. At the output from each stage, one would find a group of K bits that can be considered as the K components of a vector. At the output from the following stage, one would again find K signals and one would be able to characterize the transfer function of the stage by a matrix of K lines by K columns, the diagonal elements of this matrix would be the autocorrelation coefficients and the other elements, intercorrelation coefficients between different users.

In practice, however, the transmitted signal does not comprise one single bit but N bits, so that the values in question are no longer of dimension K but of dimension NK. The transfer matrix is then a matrix of NK lines and NK columns.

If one designates $\overline{d}$ the data vector (which has NK components), and the vector at the output from the first decorrelation stage (or matched filtering stage) is designated $\overline{y}_{mf}$ (the index mf referring to the matched filtering function), one may write, ignoring the noise, $$\overline{y}_{mf} = R\overline{d}$$

where R is an NK by NK correlation matrix. The matrix R can be broken down into K by K sub-matrices, all of which are identical if the users use the same broadcasting code for all the bits of the total message. However, this is not necessarily so in all cases.

In a precise way, for a bit in row i, the coefficient for line j and for column k of the correlation matrix is of the form:

$$P_{j,k}(i) = \int_{\tau_j}^{T_b - \tau_j} a_j(t-\tau_j) a_k(t-\tau_k - iT_b) dt$$

where $a_j$ and $a_k$ are the values (+1 or −1) of the pulses (or "chip") of the pseudo-random sequences, $T_b$ is the duration of a bit, $\tau_j$ and $\tau_k$ are delays.

Each stage of interference suppression repeats the transformation operated by the matrix R, so that at the output of stage $E_1$ one finds a signal $R\overline{y}_{mf}$, and at the output from the $i^{th}$ stage, a signal $R^i \overline{y}_{mf}$.

If the weighted sum of the signals supplied is processed by all the stages of the receiver, one obtains an estimation $\overline{d}$ of the data in the form:

$$\overline{d} = \sum_{i=0}^{s-1} w_i R^i \overline{y}_{mf} \quad (2)$$

where s is the total number of stages, one being a normal filtering stage and s−1 interference suppression stages.

There are particular detector circuits which, in theory, minimize the errors committed in the transmission and which are called Minimum Mean Square Error Detectors or MMSE detectors for short. For these detectors, the matrix for passage between the input and the output is:

$$[R + N_0 I]^{-1}$$

where I is a unit matrix of the same rank as R, and $N_0$ the spectral density of noise power. If one wishes to produce a receiver providing performance close to that of an ideal receiver, the weighting coefficients $w_i$ must be chosen in such a way that the weighted sum is as close as possible to the inverse of the matrix $[R+N_0 I]$:

$$\sum_{i=0}^{s-1} w_i R^i \cong [R + N_0 I]^{-1} \quad (3)$$

The weighted sum is precisely the quantity formed by the circuit in FIG. 2.

This relationship between matrices can be transposed into several equations using values pertinent to the matrices concerned. It is known that, for certain conditions, which are in general fulfilled in the domain in question, one can transform a matrix into a matrix where the only elements not zero are those of the diagonal, elements which are the values that are pertinent to the matrix. Each of the matrices in equation (3) being from row NK, there are in general NK pertinent values, that one can designate $\lambda_j$. Each matrix of equation (3) having been thus diagonalized, one obtains NK equations for the pertinent NK values. One will seek therefore, for each pertinent value, to make the approximation:

$$\sum_{i=0}^{s-1} w_i \lambda_j^i \cong 1/(\lambda_j + N_0) \quad (4)$$

Therefore one is in the presence of a polynomial expansion in $\lambda_j$ of degree s−1. For each $\lambda_j$ one obtains an equation in $\lambda_j$ where the unknown is $w_i$. If the number of stages s is equal to the number of pertinent values NK, then one has NK equations with NK unknown values of $w_i$ which one would be able to resolve. However, in practice, the number of stages s is very much lower than the number NK so that the number of unknowns is very much lower than the number of equations. One cannot therefore satisfy all these equations simultaneously and one must therefore be content with an approximation.

The article by S. MOSHAVI et al. already mentioned proposes a particular choice criterion based on the following considerations. The error made between the weighted sum and the reciprocal of $\lambda_j + N_0$ being designated $e_j$, the article suggests that one should not consider this error but its square weighted by a function that depends on the relevant value of $\lambda_j$ and of the noise $N_0$ and to minimize the sum of these weighted errors for all the pertinent values. In other words, it is suggested that one minimizes the quantity:

$$\sum_{j=0}^{NK-1} h(\lambda_j \cdot N_0) e_j^2 \quad (5)$$

where h ($\lambda_j . N_0$) is the weighting function with $$e_j = \sum_{j=0}^{s-1} w_1 \lambda_j^i - 1/(\lambda_j + N_0) \quad (6)$$

For various reasons that are explained in the article mentioned, the authors chose as the weighting function, a quadratic function $\lambda_j^2 + N_0 \lambda_j$, which means that the large pertinent values are favored.

The objective of this invention is to improve this technique by making a different choice for the weighting function, the aim being to reduce further the error made on the transmission of the data.

DESCRIPTION OF THE INVENTION

To this end, the invention recommends using, as the weighting function, the frequency distribution of the relevant values, which will be designated $p(\lambda)$ and which is the function that gives the number of pertinent values contained in a given interval.

Using the previous notation, this comes down to minimizing the quantity:

$$\sum_{j=0}^{NK-1} p(\lambda) \left[ \sum_{j=0}^{s-1} w_i \lambda_j^i - \frac{1}{\lambda_j + N_0} \right]^2 \quad (7)$$

In a precise way, the subject of this invention is a receiver for Code Division Multiple Access transmission through CDMA codes, this transmission being accessible to a plurality of K users each transmitting a message made up of a plurality of N binary data, each set of data pertinent to a user being transmitted after spectrum spreading by a pseudo-random binary sequence pertinent to this user, this receiver comprising s stages in series, of which a first reception stage of a global signal corresponding to the whole of the signals transmitted by the K users, this first stage comprising K channels in parallel, each channel being allocated a particular pseudo-random sequence and being capable of supplying a first estimation of the received data that corresponds to the user, having used this pseudo-random sequence, this first stage thereby supplying K signals on K outputs, (s−1) multiple access interference suppression stages, each of these stages having K inputs and K outputs, the K inputs of the first interference suppression stage being linked to the K outputs from the first reception stage, and the K inputs of the other interference suppression stages being linked to the K outputs from the interference suppression stage that precedes it, means of weighting each group of K signals supplied by the K outputs of each of the s stages, the output signals of a stage of row i (i being between 0 and s−1) being weighted by a coefficient $\beta_i$, the coefficients $\beta_i$ being chosen so that a certain quantity should be a minimum, an adder with s groups of K inputs to receive the s groups of K weighted signals, a decision means linked to the adder and receiving, for each user, a weighted sum of signals and supplying the corresponding data finally transmitted, this receiver being characterized by the choice of the weighting coefficients $\beta_I$ being made in the following way:

A being a matrix of NK lines and NK columns in which the elements of the main diagonal are zeros and the elements outside the diagonal reflect the intercorrelations between the signals transmitted by the K users for the N different binary data of the messages transmitted, this matrix A having NK pertinent values $\lambda_j$ distributed according to a certain distribution $p(\lambda)$, the polynomial expansion $\alpha_0 \lambda_j^0 + \alpha_1 \lambda_j^1 + \ldots + \alpha_i \lambda_j^i + \ldots + \alpha_{s-1} \lambda_j^{s-1}$, where the $\alpha_i$ are coefficients, having with the quantity $1/(1+\lambda_j)$, a deviation designated $e(\lambda_j)$ for each pertinent value $\lambda_j$, the quantity that one makes a minimum is the sum, for all pertinent values $\lambda_j$ of the square of this deviation, weighted by the distribution of the pertinent values, i.e.

$$\sum_{j=0}^{NK-1} p(\lambda)[e(\lambda_j)]^2,$$

with in addition the condition $\Sigma p(\lambda_j)e(\lambda_j)=0$, this double constraint defining the coefficients $\alpha_i$, the weighting coefficients $\beta_I$ modifying each stage of the receiver are derived from coefficients $\alpha_i$ by the equations $\beta_i = (-1)^i(\alpha_i + \alpha_{i+1})$ for values of i going from 0 to s−2 and $\beta_i = (-1)^i \alpha_i$ for i=s−1.

Preferably, for distribution $p(\lambda)$ of the pertinent values for the matrix A, an expression approximately equal to $\gamma^2(\lambda+1-a)\exp[-\gamma(\lambda+1-a)]$ where $\gamma$ and a are suitable constants.

DETAILED DESCRIPTION OF PARTICULAR EMBODIMENTS

Figure 1:
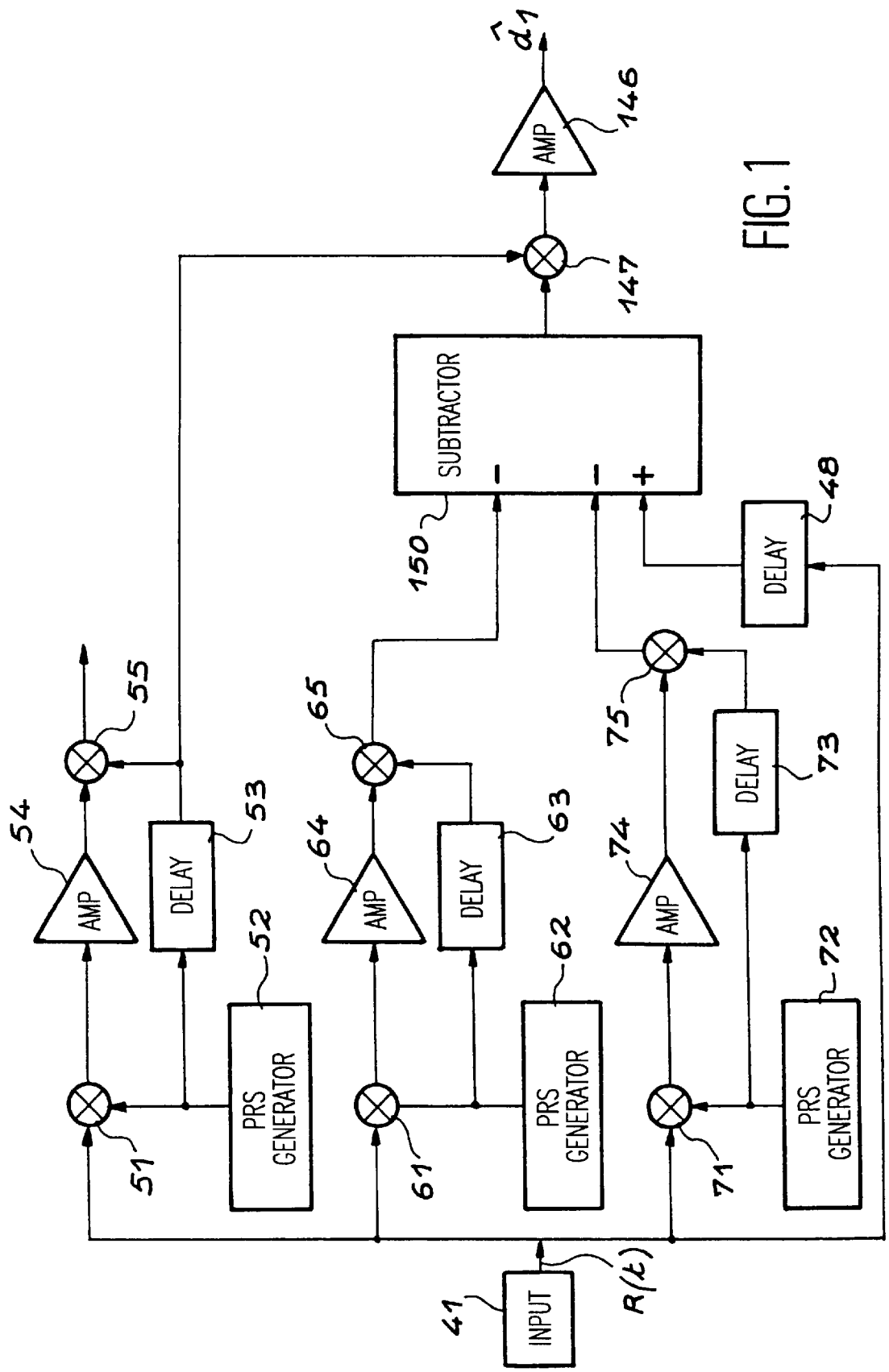
FIG. 1, already described, shows a part of a known receiver.
Figure 2:
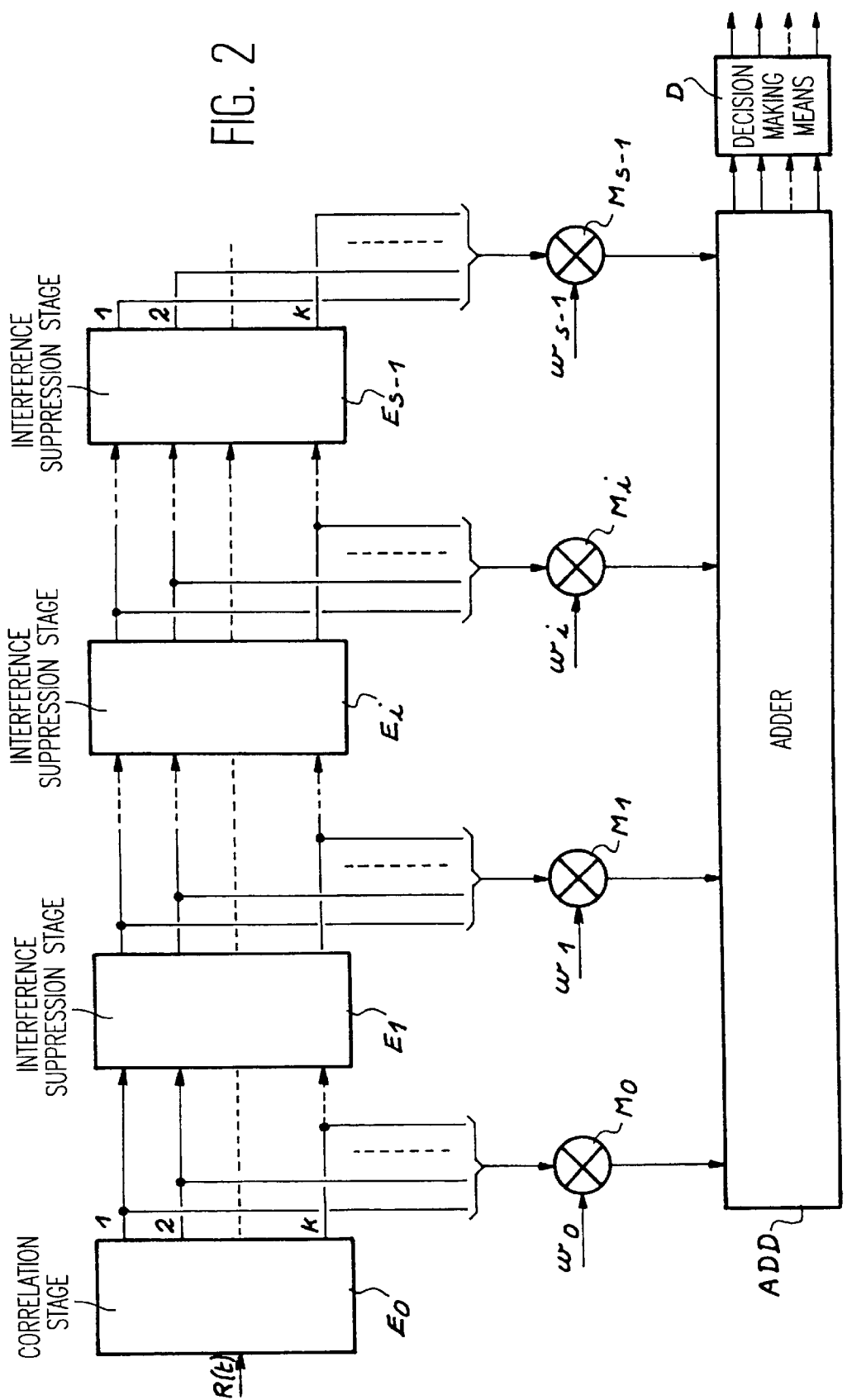
FIG. 2, already described, illustrates the use of a weighting of outputs from the various stages.

The matrix R used in the matters considered above, can be advantageously replaced by a matrix A, obtained by subtracting from R the unit matrix I the only elements of which are the diagonal terms equal to 1:

$$A=R-I \text{ or } R=A+I$$

In effect, in the matrix R one finds not only the coefficients reflecting the interference between different users for bits of the same row or of different rows (coefficients outside the diagonal) but also correlation coefficients for one and the same user (coefficients of the diagonal) and these coefficients are all equal to 1. The suppression of interference is therefore better linked to a matrix A in which all the diagonal elements are zero, since it only contains terms that express intercorrelations. This matrix is the matrix A.

The matrices R and A have different traces since the trace of a matrix is equal to the sum of the terms in its diagonal. For the matrix R, the trace is equal to NK while it is zero for the matrix A. It is known that the mean of the values belonging to a matrix is equal to its trace divided by its row, so that the mean of the values belonging to the matrix R is equal to NK/NK or 1, while the mean of the values belonging to matrix A is zero. The distribution $p(\lambda)$ of the values belonging to matrix A is therefore centered on zero.

If $\bar{y}$ designates the signals applied to the K inputs of an interference suppression stage, one finds at the output from the suppression circuit characterized by the matrix A, a signal $A\bar{y}$, that is subtracted from the incident signal, or $I\bar{y}$ so that the output from this first stage is of the form $I\bar{y}-A\bar{y}$ or $(I-A)\bar{y}$.

The second stage again processes the signal $(I-A)\bar{y}$ through the matrix A, which gives $(I-A)A\bar{y}$, which one again subtracts from $I\bar{y}$ to obtain $(I-A+A^2)\bar{y}$ and so on. At the output from the $i^{th}$ stage one therefore finds signals $\bar{Z}_i$, of the form:

$$\bar{Z}_i = \sum_{j=0}^{i} (-A)^j \bar{y} \quad (8)$$

where the index i runs from 0 to s−1.

If one linearly combines the outputs of these stages using coefficients that will be designated $\beta_i$ (with i=0, 1, ..., s−1) (in order to distinguish them from the coefficients $w_i$ of the prior art), one obtains a signal $\bar{Z}$ of the form:

$$\bar{Z} = \sum_{i=0}^{s-1} \beta_i \bar{Z}_i \quad (9)$$

or, by replacing $Z_i$ by its value taken from (8):

$$\overline{Z} = \sum_{i=0}^{s-1} \beta_i \left( \sum_{j=0}^{i} (-A)^j \right) \overline{Z}_0 \tag{10}$$

The expression (10) is a linear combination of $A^j$ with coefficients that are designated $\alpha_j$:

$$\overline{Z} = \left( \sum_{i=0}^{s-1} \alpha_i A^i \right) \overline{Z}_0 \tag{11}$$

In order to get closer to an ideal detector with decorrelation, the transfer function of which would be $R^{-1}$, i.e. $(I+A)^{-1}$, one seeks to give the polynomial expansion (11) a value as close as possible to $(I+A)^{-1}$ or:

$$\sum_{i=0}^{s-1} \alpha_i A^i \cong (I+A)^{-1} \tag{12}$$

which can be expressed, in terms of pertinent values $\lambda_j$, by the approximation:

$$\sum_{i=0}^{s-1} \alpha_i \lambda_j^i \cong 1/(1+\lambda_j) \tag{13}$$

for all NK values of j, or j=0, 1, 2, . . . , (NK−1).

Starting from the chosen coefficients $\alpha_i$ one can go back to the coefficients $\beta_i$ by establishing the equations that link these two types of coefficients. In order to find these equations, it suffices to expand the quantities $$\sum_{i} \beta_i \sum_{j} (-A)^j \text{ and } \sum_{i} \alpha_i A^i$$

and E nd to equalize the coefficients of the same power of $A^i$. One then finds, for all values of i from i=0 to i=s−2:

$$\beta_i = (-1)^i (\alpha_i + \alpha_{i+1}) \tag{14}$$

and for the last one i=s−1:

$$\beta_{s-1} = (-1)^{s-1} \alpha_{s-1} \tag{15}$$

According to the invention, the coefficients ai are subject to a double constraint, which is, designating $e(\lambda)$ the difference between $1/(1+\lambda)$ and $$\sum_{i=0}^{s-1} \alpha_i \lambda^i :$$

$$\sum_{j} p(\lambda_j) e(\lambda_j) = 0 \tag{16}$$

$$\sum_{i} p(\lambda)[e(\lambda_j)]^2 \text{ minimum} \tag{17}$$

where $p(\lambda)$ is the distribution of the pertinent values. As the number of pertinent values is very large, it may be considered that $\lambda$ is a continuous variable and that the separate summations are integrals. The constraints become:

$$\int_R p(\lambda) e(\lambda) d\lambda = 0 \tag{18}$$

$$\int_R p(\lambda) [e(\lambda)]^2 d\lambda \text{ minimum} \tag{19}$$

where R is the distribution zone of the pertinent values. The first expression (18) expresses that the mean error made is zero, and the second (19) the minimum variance of this error.

For synchronous type communications (the values of $\tau_i$ are equal), the variance of the pertinent values, i.e. the mean of the sum of the squares of the deviation of the pertinent values with respect to the mean of these pertinent values is given theoretically by:

$$\sigma_\lambda^2 = \frac{(K-1)}{M} \tag{20}$$

where K is the number of users and M is the processing gain, i.e. the ratio between the duration of a transmitted bit and the duration of the chips of the pseudo-random sequences (cf. the article by S. MOSHAVI already mentioned, equation 58). In practice ($\sigma^2_\lambda$ is determined by the simulation processes. For asynchronous communications (the values of $\tau_i$ are different), this variance is estimated by simulation processes.

In order to express quantitatively the distribution $p(\lambda)$ of the pertinent values, preferably one uses an approximation suggested in the work by A. PAPOULI entitled "Probability, Random Variables, and Stochastic Processes", McGraw Hill, Second Edition, 1985. This work gives for such a distribution the following approximation:

$$p(\lambda) = \gamma^2(\lambda + 1 - a) \exp[-\gamma(\lambda + 1 - a)] \tag{21}$$

for $\lambda \geq \alpha - 1$, with $$\gamma = 1.6785/\sigma_\lambda$$

$$a = 1 - 1.3685/\gamma$$

Figure 3:
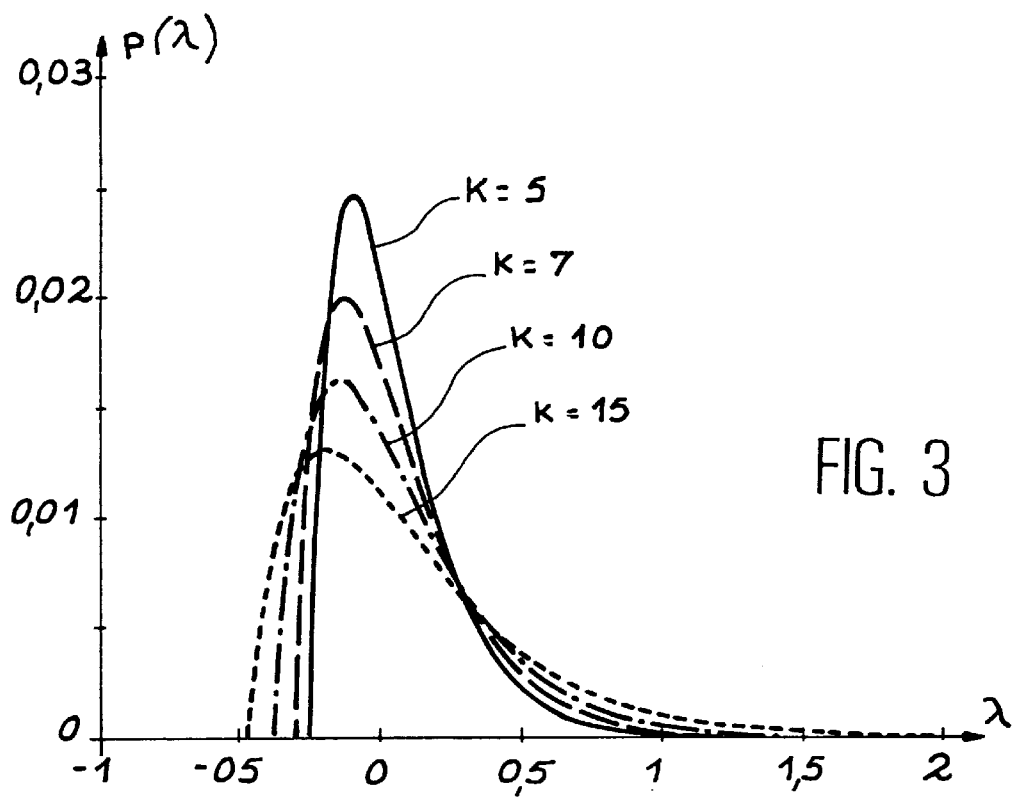
FIG. 3 shows some examples of distributions of the pertinent values of a matrix.

In order to illustrate this question of the distribution of the pertinent values, FIG. 3 shows some distributions obtained in the case of pseudo-random sequences of 63 chips for a variable number of users K (K=5, 7, 10, 15) and for synchronous transmissions. One checks on the way that the pertinent values distribute themselves correctly about 0, since their mean is zero.

According to the invention, the equality (16) is provided and the quantity (17) is minimized.

By using the approximation referred to, valid for $\lambda \geq \alpha - 1$ and by taking out the coefficient $\gamma^2$ and, in the exponential, the factor $\exp(-\gamma + \gamma a)$ which does not depend on $\lambda$, and by taking an integral form and not a discreet sum, one obtains the equation:

$$\int_{\alpha-1}^{\infty} (\lambda + 1 - a) \exp(-\gamma \lambda) e(\lambda) d\lambda = 0 \tag{22}$$

and the quantity $$\int_{\alpha-1}^{\infty} (\lambda + 1 - a) \exp(-\gamma \lambda) e^2(\lambda) d\lambda \tag{23}$$

is minimized.

Equation 22 supplies $$\frac{\exp(-\gamma(a-1))}{\gamma} a\xi - \sum_{k=1}^{s-1} a_k [v(k+1) + (1-a)v(k)] = 0$$

where:

$$\xi = \int_{\alpha-1}^{+\infty} \frac{\exp(-\gamma\lambda)}{\lambda+1} d\lambda$$

which works out numerically:

$$v(k) = \exp(-\gamma(a-1)) \sum_{n=0}^{k=1} \frac{k!}{(n-n)!} \frac{(a-1)^{k-n}}{\gamma^{n+1}} + \frac{k!}{\gamma^{k+1}} \text{ for } k \neq 0$$

$$v(k) \frac{k}{\gamma} v(k-1) + \frac{(a-1)^k}{\gamma} \exp(-\gamma(a-1)), \text{ for } k \geq 1.$$

Finally one obtains an equation of the kind:

$$\alpha_0 = f(\alpha_1, \alpha_2 \ldots, \alpha_{s-1}) \quad (24)$$

where f is a polynomial of the first degree in variables $\alpha_1, \alpha_2 \ldots, \alpha_{s-1}$.

The quantity to be minimized is a polynomial of degree 2 in variables $\alpha_0, \alpha_1, \alpha_2 \ldots, \alpha_{s-1}$ which has for an equation:

$$w(0) - \alpha\phi + \sum_{k=0}^{s-1}\sum_{j=0}^{s-1} \alpha_k \alpha_j v(j+k+1) + \quad (25)$$

$$(1-\alpha)\sum_{k=0}^{s-1}\sum_{j=0}^{s-1} \alpha_k \alpha_j v(j+k) - 2\sum_{k=0}^{s-1} \alpha_k v(k) + 2\alpha \sum_{k=0}^{s} \alpha_k w(k)$$

where $$\phi = \int_{\alpha-1}^{+\infty} \frac{\exp(-\gamma x)}{(1+x)^2} dx$$

which works out numerically $$w(k) = \sum_{n=0}^{k-1} (-1)^{n-k+1} v(n), \text{ whenever } k \neq 0, \quad (26)$$

and, $$w(0) = \xi \quad (27)$$

or better, with the following recursion formula:

$$w(k) = v(k-1) - w(k-1), \text{ for } k \geq 1. \quad (28)$$

The minimization looked for, by the deletion of the first derivatives of (25) according to each of the variables $\alpha_0, \alpha_1, \alpha_2 \ldots, \alpha_{s-1}$, supplies s equations with s variables:

$$\sum_{j=0}^{s-1} \alpha_j [v(u+j+1) + (1-\alpha)v(u+j)] = v(u) - w(u) \quad (29)$$

for u within the interval 0, s−1.

In these equations, the first (for u=0) is redundant with (27).

With s equations with s unknowns $\alpha_0, \alpha_1, \alpha_2 \ldots, \alpha_{s-}$, one finds that one can solve them in a numerical way, which gives s coefficients $\alpha_i$.

Then the coefficients $\beta_i$ that are being looked for can be obtained easily through equations (14) and (15) that have already been shown.

By way of an example, we may consider a circuit with two stages (s=2) with one correlation stage and one interference suppression stage and we will take the case of there being five perfectly synchronous users (K=5) using pseudo-random sequences each with 63 chips. One then has $\sigma^2_\lambda \approx 0.06$ $\alpha \approx 0.75$ $\gamma \approx 6.66$ $\xi \approx 0.91$ $\Phi \approx 1.06$ One is looking for a pair of coefficients ($\alpha_0, \alpha_1$) such that:

$$\int_{\alpha-1}^{+\infty} \left(\frac{1}{1+x} - \alpha_0 - \alpha_1 x\right)(x+1-\alpha)\exp(-\gamma x)dx = 0 \quad (30)$$

and such that:

$$\int_{\alpha-1}^{+\infty} \left(\frac{1}{1+x} - \alpha_0 - \alpha_1 x\right)^2 (x+1-\alpha)\exp(-\gamma x)dx \quad (31)$$

be a minimum

Equation (30) gives us $$\alpha_0\left(\frac{1}{\gamma^2}\right) = \left(\frac{1}{\gamma} - \alpha\xi\exp(\gamma(\alpha-1))\right) \quad (32)$$

or:

$\alpha_0 \approx 1.02$

By deriving expression (31) with respect to $\alpha_1$, one obtains:

$$\alpha_1 \left[\frac{\gamma^3(\alpha-1)^3 + 3\gamma^2(\alpha-1)^2 + 6\gamma(\alpha-1) + 6}{\gamma^3} + \right. \quad (33)$$

$$\left. (1-\alpha)\frac{\gamma^3(\alpha-1)^2 + 2(1+\gamma(\alpha-1))}{\gamma^3}\right]$$

$$\exp(-\gamma(\alpha-1)) = \exp(-\gamma(x-1))\left[\frac{\gamma(\alpha-1)+1}{\gamma^3} - \frac{\alpha}{\gamma}\right] + \alpha\xi$$

or $\alpha_1 \approx 0.78$ which gives us $\beta_1 = -\alpha_1 \approx 0.78$ $\beta_0 = -\beta_1 + \alpha_0 0.24$ This example, which involves two coefficients corresponds therefore to a linear approximation $\alpha_0\lambda^0 + \alpha_1\lambda^1$, i.e. $1.02 - 0.78\lambda$, deemed to at best, come close to $1/1 + \lambda$.

The following tables correspond to various situations in which a number of stages s ranges from 1 to 5 and a number of users K ranges from 2 to 10. These tables give directly the weighting coefficients $\beta$ of the outputs of s stages (for s=2 and K=5, one may refer to the previous example).

TABLE 1 s = 2

| $\beta_i$ | K = 2 | K = 3 | K = 4 | K = 5 | K = 6 | K = 7 | K = 8 | K = 9 | K = 10 |
|---|---|---|---|---|---|---|---|---|---|
| $\beta_0$ | 0.14 | 0.19 | 0.22 | 0.24 | 0.25 | 0.27 | 0.28 | 0.30 | 0.30 |
| $\beta_1$ | 0.85 | 0.82 | 0.80 | 0.78 | 0.77 | 0.76 | 0.76 | 0.75 | 0.75 |

TABLE 2 s = 3

| $\beta_i$ | K = 2 | K = 3 | K = 4 | K = 5 | K = 6 | K = 7 | K = 8 | K = 9 | K = 10 |
|---|---|---|---|---|---|---|---|---|---|
| $\beta_0$ | 0.01 | 0.01 | 0.01 | 0.02 | 0.02 | 0.02 | 0.02 | 0.01 | 0.01 |
| $\beta_1$ | 0.32 | 0.40 | 0.43 | 0.46 | 0.49 | 0.51 | 0.53 | 0.55 | 0.56 |
| $\beta_2$ | 0.66 | 0.60 | 0.55 | 0.52 | 0.50 | 0.48 | 0.47 | 0.46 | 0.45 |

TABLE 3 s = 4

| $\beta_i$ | K = 2 | K = 3 | K = 4 | K = 5 | K = 6 | K = 7 | K = 8 | K = 9 | K = 10 |
|---|---|---|---|---|---|---|---|---|---|
| $\beta_0$ | 0.00 | 0.00 | −0.01 | −0.02 | −0.02 | −0.03 | −0.04 | −0.04 | −0.05 |
| $\beta_1$ | 0.14 | 0.12 | 0.15 | 0.17 | 0.19 | 0.21 | 0.23 | 0.24 | 0.26 |
| $\beta_2$ | 0.49 | 0.50 | 0.52 | 0.54 | 0.55 | 0.56 | 0.56 | 0.57 | 0.58 |
| $\beta_3$ | 0.37 | 0.39 | 0.34 | 0.30 | 0.28 | 0.26 | 0.25 | 0.23 | 0.22 |

TABLE 4 s = 5

| $\beta_i$ | K = 2 | K = 3 | K = 4 | K = 5 | K = 6 | K = 7 | K = 8 | K = 9 | K = 10 |
|---|---|---|---|---|---|---|---|---|---|
| $\beta_0$ | 0.00 | 0.00 | −0.01 | −0.01 | −0.02 | −0.02 | −0.03 | −0.04 | −0.05 |
| $\beta_1$ | 0.36 | 0.02 | 0.03 | 0.04 | 0.04 | 0.05 | 0.05 | 0.06 | 0.06 |
| $\beta_2$ | 1.34 | 0.27 | 0.31 | 0.35 | 0.38 | 0.40 | 0.42 | 0.44 | 0.46 |
| $\beta_3$ | 0.37 | 0.48 | 0.47 | 0.46 | 0.45 | 0.44 | 0.43 | 0.43 | 0.22 |
| $\beta_4$ | −1.08 | 0.22 | 0.18 | 0.16 | 0.14 | 0.13 | 0.11 | 0.10 | 0.10 |

TABLE 5 s = 6

| $\beta_i$ | K = 2 | K = 3 | K = 4 | K = 5 | K = 6 | K = 7 | K = 8 | K = 9 | K = 10 |
|---|---|---|---|---|---|---|---|---|---|
| $\beta_0$ | −0.09 | 0.00 | 0.00 | 0.00 | −0.01 | −0.01 | −0.02 | −0.02 | −0.03 |
| $\beta_1$ | 1.24 | 0.00 | 0.00 | 0.00 | −0.01 | −0.09 | −0.01 | −0.02 | −0.02 |
| $\beta_2$ | 9.83 | 0.16 | 0.15 | 0.18 | 0.20 | 0.2 | 0.24 | 0.26 | 0.28 |
| $\beta_3$ | 11.78 | 0.4 | 0.41 | 0.43 | 0.45 | 0.53 | 0.47 | 0.48 | 0.48 |
| $\beta_4$ | −8.89 | 0.3 | 0.35 | 0.32 | 0.30 | 0.32 | 0.27 | 0.26 | 0.24 |
| $\beta_5$ | −12.57 | 0.09 | 0.09 | 0.07 | 0.06 | 0.05 | 0.05 | 0.04 | 0.04 |

Figure 4:
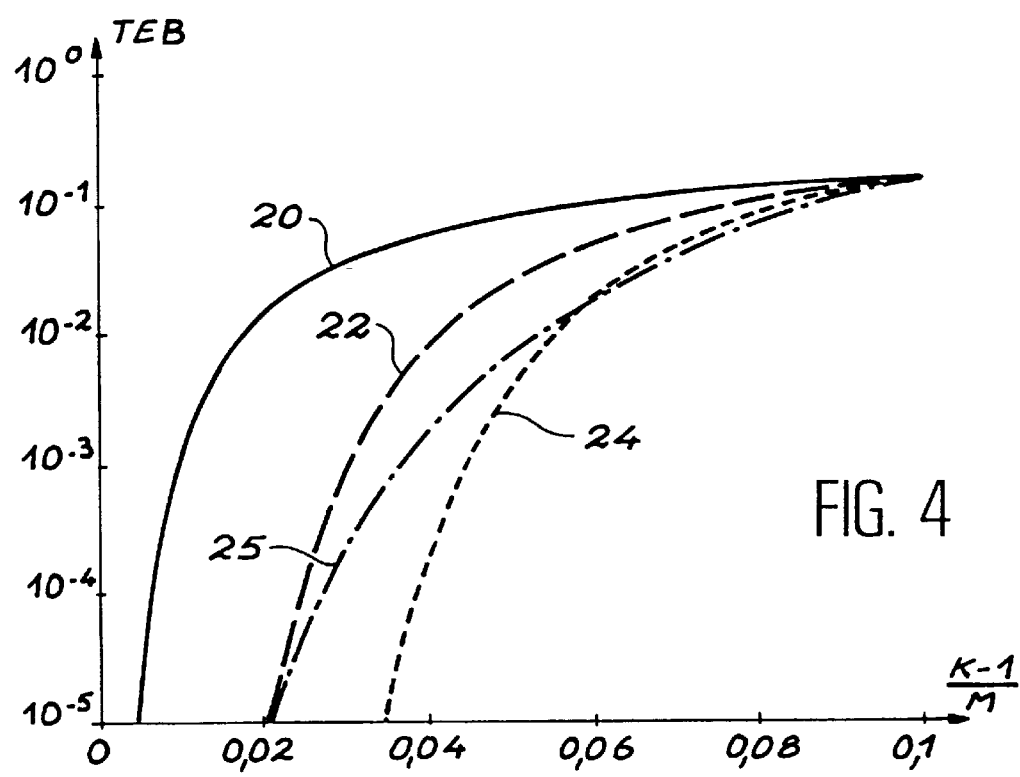
FIG. 4 illustrates the theoretical performance of a receiver conforming to the invention, compared to the performance of known receivers.
Figure 5:
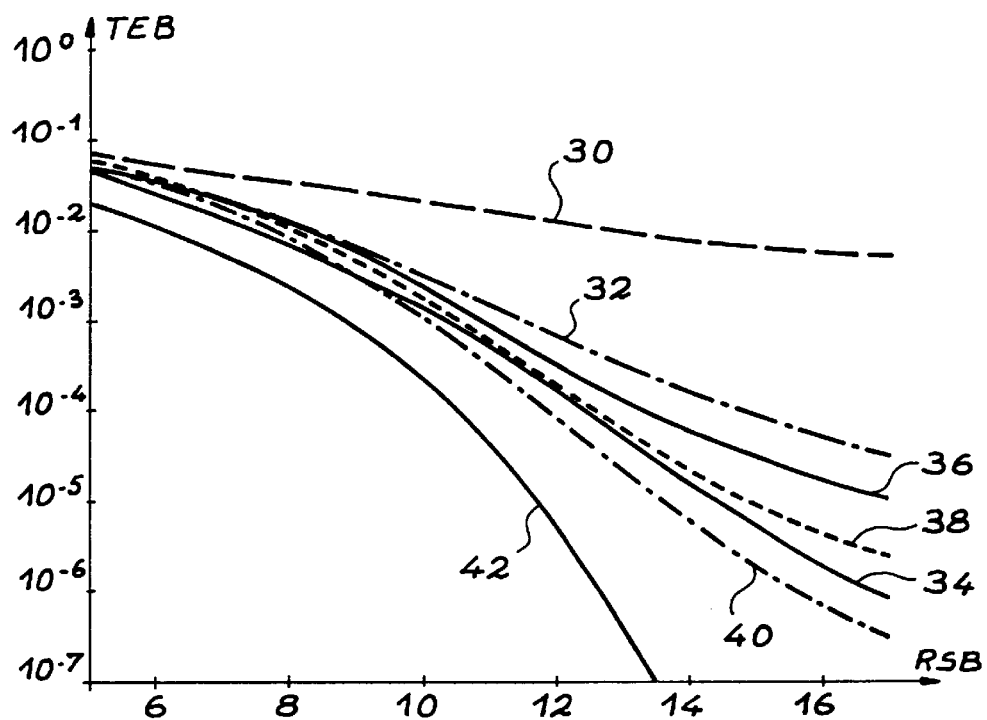
FIG. 5 permits a comparison to be made between different receivers, under certain using conditions.
Figure 6:
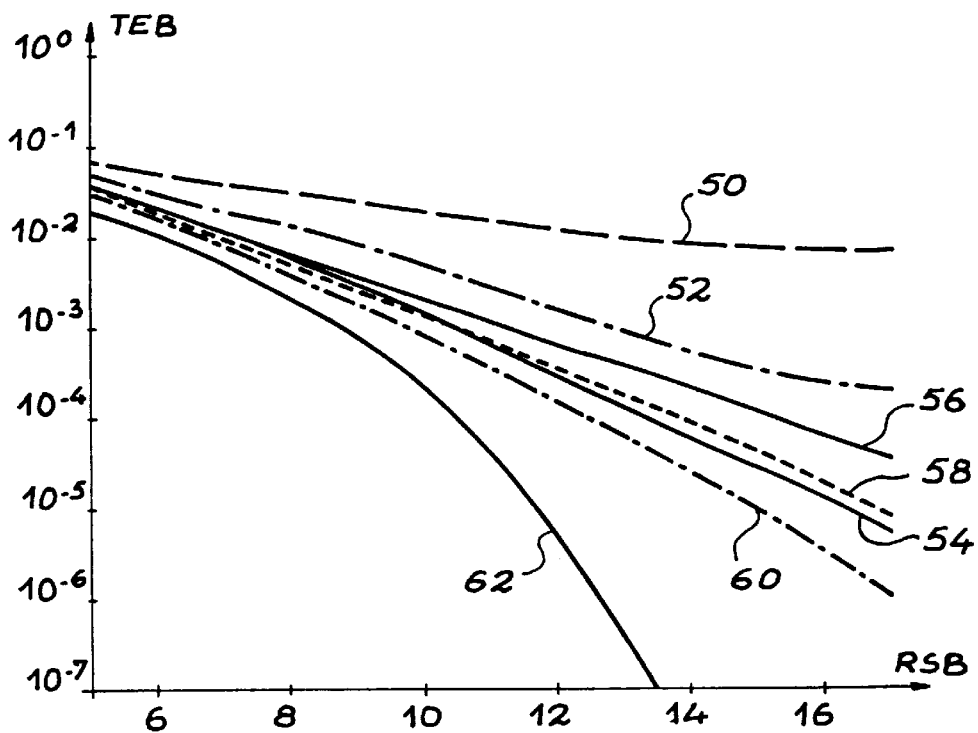
FIG. 6 allows another comparison to be made between different receivers

FIGS. 4, 5 and 6 allow one to compare the theoretical performance of a receiver conforming to the invention with that of known receivers.

In FIG. 4, firstly the bit error rate (TEB) is shown as a function of the ratio (K−1)/M where K is the number of users and M is the processing gain. In the case illustrated M is equal to 63 (number of chips per bit).

The bit error rate increases with the number of users and reduces when the processing gain increases. The curve 20 corresponds to a traditional receiver without any interference suppression stages; curve 22 to a receiver with one suppression stage; curve 24 to a receiver with two suppression stages and curve 25 to a receiver according to the invention with one suppression stage and the linear weighting described. The performance is better than with an equal number of interference stages (in this case 1) and as good as that with two stages as soon as (K−1)/M is greater than 0.06, i.e. with five or more users.

FIGS. 5 and 6 are simulations representing the bit error rate (TEB) as a function of the signal to noise ratio RSB. The error rate becomes smaller as the signal to noise ratio increases. In FIG. 5, the curve 30 corresponds to a traditional receiver without any interference suppression stages; curve 32 corresponds to a receiver with one parallel interference suppression stage; curve 34 corresponds to a receiver with two parallel interference suppression stages curve 36 corresponds to a receiver conforming to patent U.S. Pat. No. 5,553,062 (with weighting coefficients $1/2^i$) curve 38 corresponds to a receiver that conforms to the article by S. MOSHAVI at al. already mentioned (quadratic weighting); curve 40 corresponds to a receiver that conforms to this invention; finally curve 42 corresponds to the theoretical case of a receiver with perfect decorrelation.

This simulation corresponds to a DQPSK type modulation ("Differential Quaternary Phase Shift Keying" or differential phase modulation with four states). It also corresponds to the case where the impulse response is formed from a single spectral line, in a theoretical channel where there would be only one path. The noise is assumed to be Gaussian, white, centered and additive.

FIG. 6 corresponds to the same assumptions (DQPSK modulation and centered additive Gaussian white noise) but also assumes that in addition to the main path, there are three supplementary paths in accordance with RAYLEIGH's law. The curves are marked as for FIG. 5 with a difference of 20 in the reference numbers: 50 traditional receiver without any interference suppression; 52: receiver with one interference suppression stage; 54: receiver with two interference suppression stages; 56: receiver according to U.S. Pat. No. 5,553,062; 58: receiver according to S. MOSHAVI et al.; 60: receiver according to the invention; 62: theoretical receiver.

These results clearly show the improvement provided by the invention, since the bit error rate is the lowest.

Figure 7:
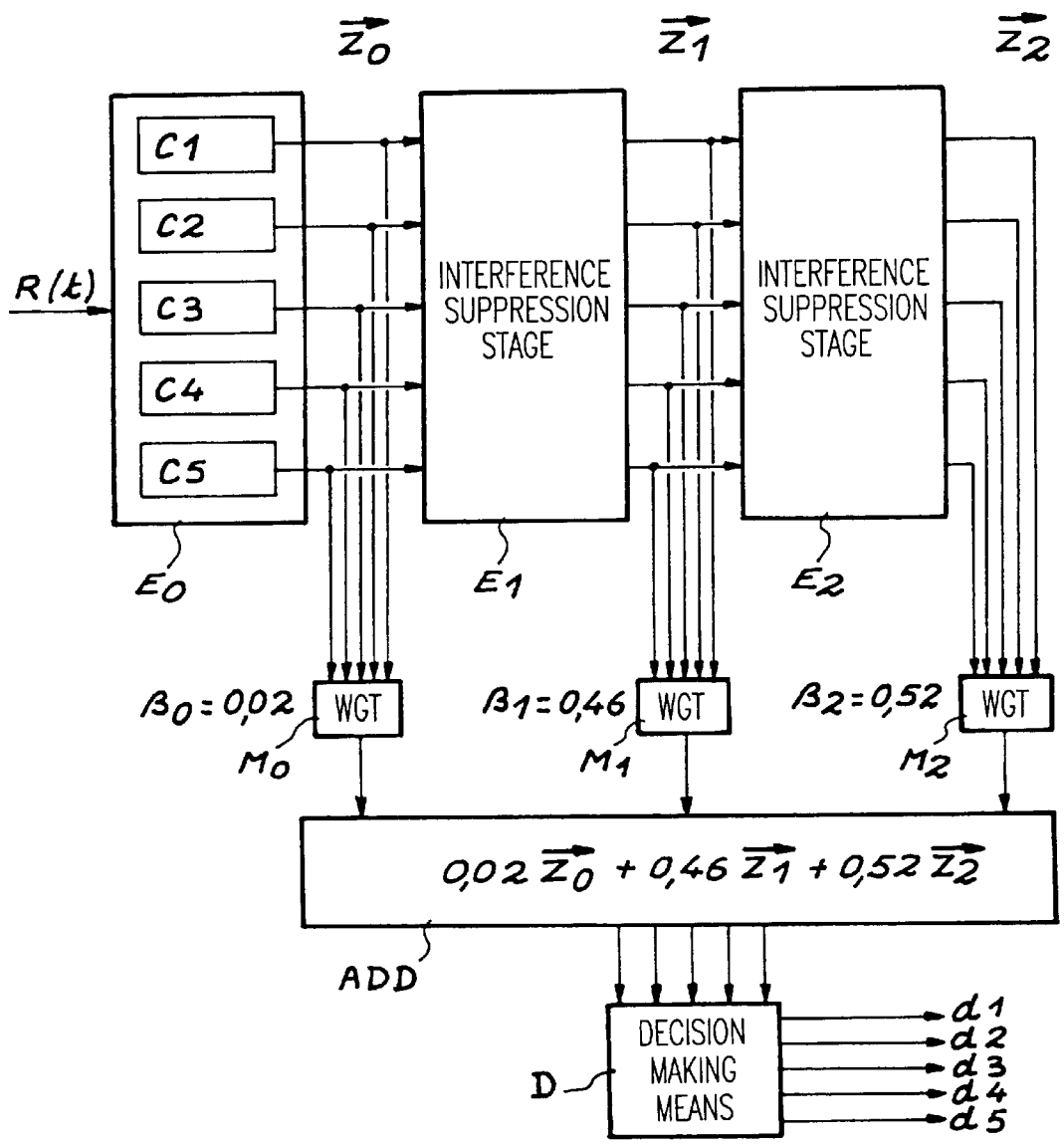
FIG. 7 shows diagrammatically the general structure of a receiver according to the invention in the particular case of five users and three stages.

FIG. 7 illustrates a receiver according to the invention for the particular case of five users and three stages. One can see on this Figure, a first stage EO with five parallel channels $C_1$, $C_2$, $C_3$, $C_4$, $C_5$ (K=5), each channel being allocated to a particular pseudo-random sequence and being capable of supplying a first estimate $Z_0$ of the data received and two interference suppression stages $E_1$, $E_2$ with five inputs and five outputs, three weighting means (WGT) $M_0$, $M_1$, $M_2$ multiplying the outputs $Z_0$, $Z_1$, $Z_2$ by the coefficients $\beta_0$, $\beta_1$, $\beta_2$ equal respectively to 0.02, 0.46 and 0.52, an adder ADD summing the outputs from the weighting means, and a decision making means D linked to the adder ADD and supplying the data d1, d2, d3, d4 and d5.

Figure 8:
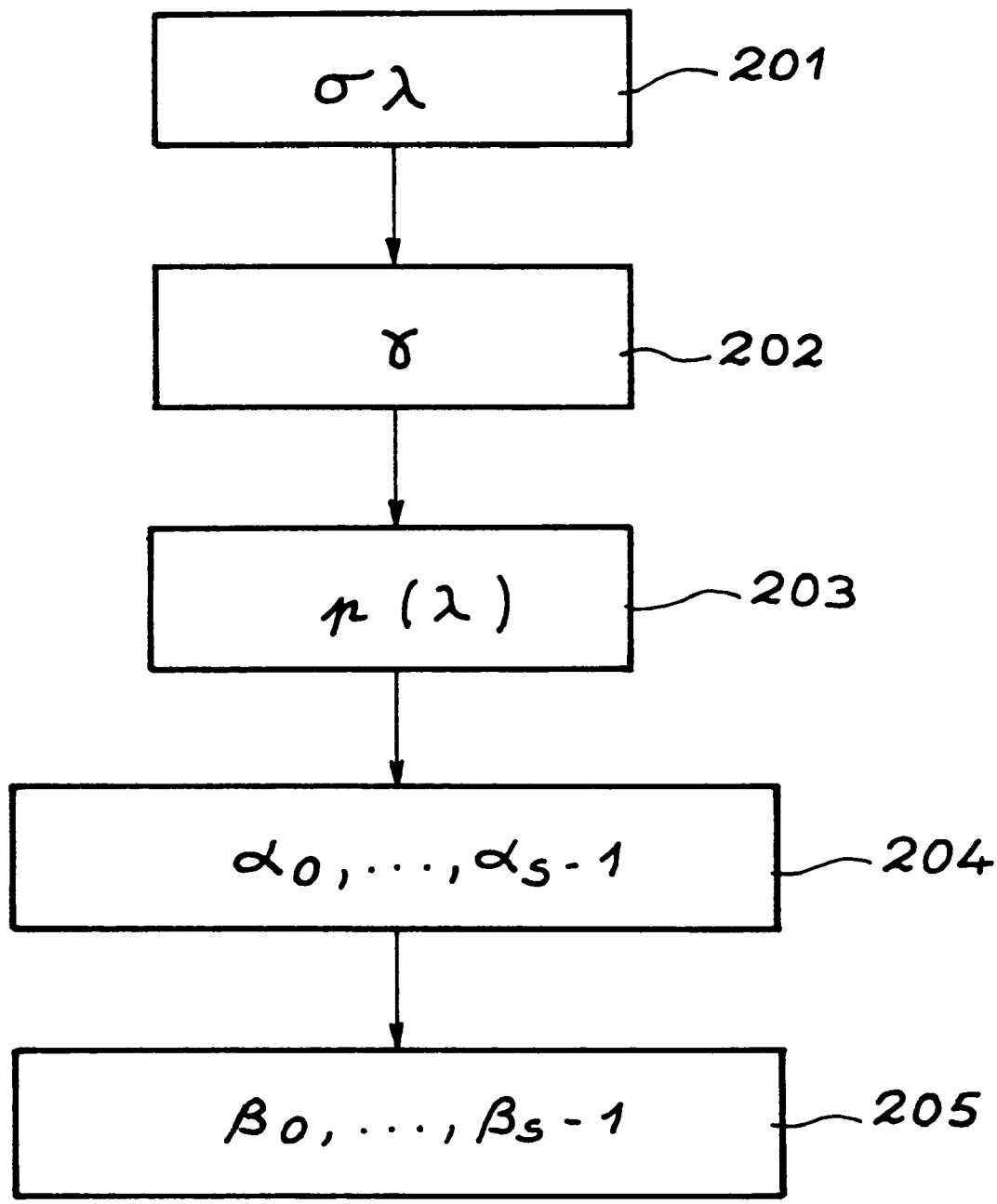
FIG. 8 shows a flow chart illustrating a general algorithm.

FIG. 8 is a flow chart illustrating the general algorithm for obtaining the coefficients β. It comprises the following operations:

201: determination of $\sigma_\lambda$ by simulations

202: determination of the value of γ via expression (17),

203: determination of the distribution p (λ),

204: calculation of the coefficients $\alpha_0, \ldots, \alpha_{s-1}$ via (29)

205: calculation of the coefficients $\beta_0, \ldots, \beta_{s-1}$ via (14) and (15)

Figure 9:
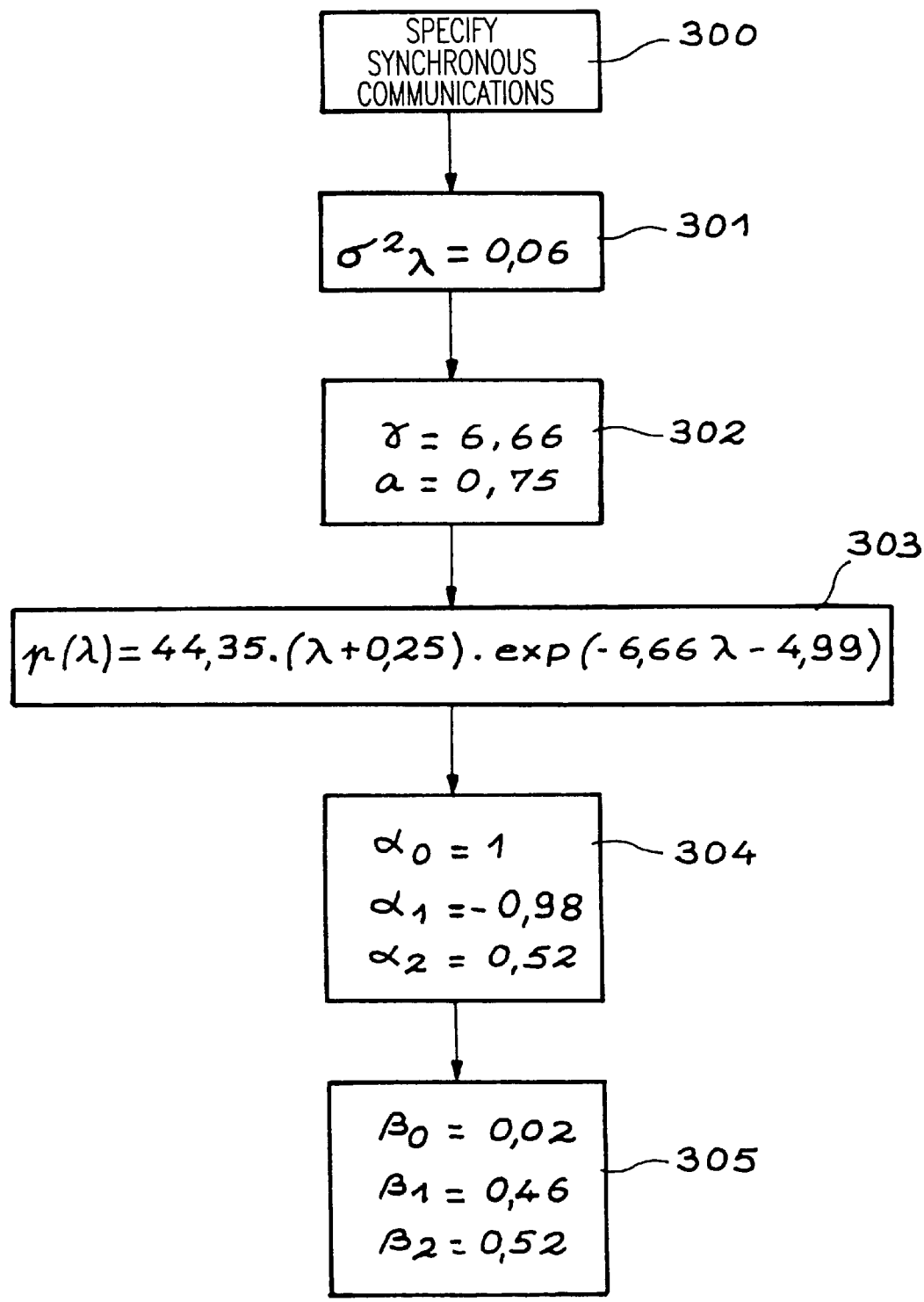
FIG. 9 shows a flow chart applied to the particular case of the circuit in FIG. 7

FIG. 9 is a flow chart illustrating the particular algorithm corresponding to the particular case of FIG. 7. The operations are the following:

300: one specifies that the communications are synchronous

301: determination that $\sigma^2_\lambda = 0.06$

302: determination that $\gamma = 6.66$ and $a = 0.75$,

303: calculation of $p(\lambda)$: $p(\lambda) = 44.35 (\lambda + 0.25) \exp(-6.66\lambda - 4.99)$

304: determination that $\alpha_0 = 1$
$\alpha_1 = -0.98$
$\alpha_2 = 0.52$

305: determination that $\beta_0 = 0.02$
$\beta_1 = 0.46$
$\beta_2 = 0.52$

What is claimed is:

1. A receiver for Code Division Multiple Access (CDMA) transmission, this transmission being accessible to a plurality of K users each transmitting a message made up of a plurality of N binary data, each piece of data pertinent to a user being transmitted after spectrum spreading by a pseudo-random binary sequence belonging to that user, this receiver comprising s stages in series, of which:

a first stage of reception of a global signal corresponding to all the signals transmitted by the K users, this first stage comprising K channels in parallel, each channel being allocated a particular pseudo-random sequence and being capable of supplying a first estimate of the data received corresponding to the user having used that pseudo-random sequence, this first stage thereby supplying K signals on K outputs, (s−1) stages of multiple access interference suppression, each of these stages having K inputs and K outputs, the K inputs of the first interference suppression stage being connected to the K outputs of the first reception stage, and the K inputs of the other interference suppression stages being connected to the K outputs from the interference suppression stage that precedes it, means of weighting each group of K signals supplied through the K outputs from each of the s stages, the output signals from a stage of rank i (i being between 0 and s−1) being weighted by a coefficient $\beta_i$ the coefficients $\beta_i$ being chosen so that a certain quantity is a minimum, an adder with s groups of K inputs to receive the s groups of K weighted signals, a decision making means, connected to the adder and receiving, for each user, a weighted sum of signals and supplying the corresponding data finally transmitted, this receiver being characterized by the choice of the weighting coefficients $\beta_i$ in the following way:

A being a matrix of NK lines and NK columns in which the elements of the main diagonal are zeros and the elements outside the diagonal reflect the intercorrelations between the signals transmitted by the K users for the N different binary data of the transmitted messages, this matrix A having NK pertinent values $\lambda_j$ distributed in accordance with a certain distribution $p(\lambda)$, the polynomial expansion $\alpha_0 \lambda^0_j + \alpha_1 \lambda^1_j + \ldots + \alpha_i \lambda^i_j + \ldots + \alpha_{s-1} \lambda_j^{s-1}$, where the $\alpha_i$ are coefficients, having with the quantity $1/(1+\lambda_j)$, a deviation designated $e(\lambda_j)$ for each pertinent value $\lambda_j$, the quantity that is made a minimum is the sum, for all pertinent values $\lambda_j$ of the square of this deviation, weighted by the distribution of the pertinent values, i.e.

$$\sum_{j=0}^{NK-1} p(\lambda)[e(\lambda_j)]^2,$$

with in addition the condition $$\sum_{j=0}^{NK-1} p(\lambda_j) e(\lambda_j) = 0,$$

this double constraint defining the coefficients $\alpha_i$, the weighting coefficients $\beta_I$ modifying each stage of the receiver are derived from coefficients $\alpha_I$ by the equations $\beta_i = (-1)^i (\alpha_i + \alpha_{i+1})$ for values of i going from 0 to s−2 and $\beta_i = (-1)^i \alpha_i$ for i=s−1.

2. A receiver according to claim 1, in which one takes for distribution $p(\lambda)$ of the pertinent values of the matrix A, an approximate expression equal to $\gamma^2 (\lambda + 1 - a) \exp[-\gamma(\lambda + 1 - a)]$ where $\gamma$ and $a$ are suitable constants.

3. A receiver according to claim 2 for synchronous communications, comprising two stages (s=2), a first reception stage and an interference suppression stage, in which:

the weighting coefficient $\beta_0$ is between about 0.14 and about 0.30, the second weighting coefficient $\beta_1$ is between about 0.85 and about 0.75.

4. A receiver according to claim 1 for synchronous communications, comprising three steps (s=3), a first reception stage followed by two interference suppression stages, in which:

the first weighting coefficient $\beta_0$ is between about 0.01 and about 0.02, the second weighting coefficient $\beta_1$ is between about 0.32 and about 0.56, the third weighting coefficient $\beta_2$ is between about 0.66 and about 0.45.

5. A receiver according to claim 1 for synchronous communications, comprising four stages (s=4), a reception stage followed by three interference suppression stages, in which:

the first weighting coefficient $\beta_0$ is approximately zero, the second weighting coefficient $\beta_1$ is between about 0.14 and about 0.26, the third weighting coefficient $\beta_2$ is between about 0.49 and about 0.58, the fourth weighting coefficient $\beta_3$ is between about 0.37 and about 0.22.

6. A receiver according to claim 1 for synchronous communications, comprising five stages (s=5), a reception stage followed by four interference suppression stages, in which:

the weighting coefficient $\beta_0$ is approximately zero, the weighting coefficient $\beta_1$ is close to 0.36 for two users or between about 0.02 and about 0.06 for more than two users, the weighting coefficient $\beta_2$ is close to 1.34 for two users or between about 0.27 and about 0.46 for more than two users, the weighting coefficient $\beta_3$ is close to 0.37 for two users or between about 0.48 and about 0.42 for more than two users, the weighting coefficient $\beta_4$ is close to −1.08 for two users or between about 0.22 and about 0.10 for more than two users.

7. A receiver according to claim 1 for synchronous communications, comprising six stages (s=6), a reception stage followed by five interference suppression stages, in which:

the weighting coefficient $\beta_0$ is approximately zero, the weighting coefficient $\beta_1$ is close to 1.24 for two users or approximately zero for more than two users, the weighting coefficient $\beta_2$ is close to 9.83 for two users or between about 0.16 and about 0.28 for more than two users, the weighting coefficient $\beta_3$ is close to 11.78 for two users or between about 0.40 and 0.48 for more than two users, the weighting coefficient $\beta_4$ is close to −8.89 for two users or between about 0.3 and 0.24 for more than two users, the weighting coefficient $\beta_5$ is close to −12.57 for two users or between 0.09 and 0.04 for more than two users.

* * * * *